Patented Feb. 17, 1931

1,793,152

UNITED STATES PATENT OFFICE

MAX BAZLEN AND EMIL RIEGER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PROCESS FOR THE PRODUCTION OF CALCIUM FORMALDEHYDE SULPHOXYLATES

No Drawing. Application filed October 31, 1927, Serial No. 230,178, and in Germany December 14, 1926.

If an aqueous solution of an alkali metal formaldehyde sulphoxylate be treated with milk of lime, a difficultly soluble dicalcium salt is precipitated, containing 1 atom of sulfur to 1 atom of calcium. The precipitation, however, is incomplete.

We have now found that a difficultly soluble calcium salt is produced, with almost quantitative yield, by allowing calcium chlorid, or another soluble calcium salt, and calcium hydroxid to act on a solution of alkali metal formaldehyde sulphoxylate. The precipitated salt contains 4 atoms of sulfur to 3 atoms of calcium. The compound thus formed has probably the molecular formula $$Ca_3S_4O_{12}C_4H_{10}$$

when completely dry. The compound probably has the structural formula

OH.CH$_2$.SO$_2$.Ca.SO$_2$.CH$_2$.O.Ca.
  O.CH$_2$.SO$_2$.Ca.SO$_2$.CH$_2$.OH.

The calcium hydroxid which is employed in an amount calculated in accordance with the aforementioned proportions may also be replaced by caustic soda solution or caustic potash solution together with a soluble calcium salt or at a higher temperature, by calcium carbonate, or alkali metal carbonate and a soluble calcium salt. The said process may also be carried out by adding calcium hydroxid alone at first, and then a sufficient amount of an acid, such as hydrochloric acid, to form an adequate quantity of calcium chlorid in the reaction mass itself. As in the double decomposition of alkali metal formaldehyde sulphoxylate and calcium salt together with caustic lime, mono-calcium formaldehyde sulphoxylate is first formed, monocalcium formaldehyde sulphoxylate previously prepared in any suitable manner may be taken in place of alkali metal formaldehyde sulphoxylate and treated together with calcium hydroxid or carbonate which may be added as such or produced in the liquor by the reaction of a soluble calcium salt with caustic alkali or an alkali metal carbonate.

The following examples will further illustrate the nature of the said invention, but the invention is not limited thereto.

Example 1

140 kilograms of crystallized sodium formaldehyde sulphoxylate $$(NaSO_2CH_2OH + 2H_2O)$$

are dissolved in 250 litres of water. A solution of 57 kilograms of anhydrous calcium chloride in 250 litres of water is added, the mixture is heated to a temperature of about 45° centigrade and a thin aqueous suspension of 17 kilograms of burnt lime is gradually added, while stirring, during a period of one and a half hours. Stirring is continued, and the temperature is maintained at a temperature of about 45° centigrade for a further three hours, the mixture being stirred until it gradually becomes cool. The whole mass becomes viscous at first, but turns fluid at the end of several hours. The resulting calcium formaldehyde sulphoxylate is filtered off, by suction, washed with water and dried in a vacuum drier.

Example 2

40 kilograms of anhydrous calcium chlorid, dissolved in 300 litres of water, are added to a solution of 60 kilograms of crystallized sodium formaldehyde sulphoxylate in 500 litres of water at a temperature of from 30° to 40° centigrade. A solution of 8 kilograms of caustic soda in 100 litres of water is added slowly while stirring, at a temperature of from 30° to 40° centigrade, stirred for another hour, filtered, washed with water and dried in vacuo. The precipitation is complete.

Example 3

60 kilograms of crystallized sodium formaldehyde sulphoxylate are dissolved in 500 litres of water, treated with 40 kilograms of anhydrous calcium chlorid and heated to a temperature of about 90° centigrade while stirring. 13 kilograms of soda ash dissolved in 100 litres of water are run in slowly, and stirring is continued for several hours longer at a temperature of from 90° to 95° centigrade. The calcium salt is then filtered off by suction, washed with water and dried in vacuo.

What we claim is:

1. The process of producing a difficultly soluble calcium formaldehyde sulphoxylate probably corresponding to the formula $$OH.CH_2.SO_2.Ca.SO_2.CH_2.O.Ca.$$
$$O.CH_2.SO_2.Ca.SO_2.CH_2.OH.$$

which consists in acting on a solution of an alkali metal formaldehyde sulphoxylate with a soluble calcium salt together with a substance selected from the class consisting of calcium hydroxid, caustic alkali solution and the corresponding carbonates.

2. In the process according to claim 1 the step of employing calcium chlorid as the soluble calcium salt.

3. The process of producing a difficultly soluble calcium formaldehyde sulphoxylate probably corresponding to the formula $$OH.CH_2.SO_2.Ca.SO_2.CH_2.O.Ca.$$
$$O.CH_2.SO_2.Ca.SO_2.CH_2.OH.$$

which comprises treating a monocalcium formaldehyde sulphoxylate with a calcium compound selected from the class consisting of calcium hydroxide and carbonate.

4. The process of producing a difficultly soluble calcium formaldehyde sulphoxylate $$OH.CH_2.SO_2.Ca.SO_2.CH_2.O.Ca.$$
$$O.CH_2.SO_2.Ca.SO_2.CH_2.OH.$$

which consists in acting on 4 molecular proportions of alkali metal formaldehyde sulphoxylate with 2 molecular proportions of a soluble calcium salt and 1 molecular proportion of calcium hydroxid.

5. As new article of manufacture, a difficultly soluble calcium formaldehyde sulphoxylate containing 3 atoms of calcium for each 4 atoms of sulfur and which probably corresponds to the formula $$OH.CH_2.SO_2.Ca.SO_2.CH_2.O.Ca.$$
$$O.CH_2.SO_2.Ca.SO_2.CH_2.OH.$$

which is obtainable by acting on a solution of an alkali metal formaldehyde sulphoxylate with calcium chlorid together with calcium hydroxid.

In testimony whereof we have hereunto set our hands.

MAX BAZLEN.
EMIL RIEGER.

CERTIFICATE OF CORRECTION.

Patent No. 1,793,152. Granted February 17, 1931, to

MAX BAZLEN ET AL.

It is hereby certified that error appears in the printed specification of the above numbered patent requiring correction as follows: Page 2, line 31, claim 4, after the word "sulphoxylate" insert probably corresponding to the formula; and that the said Letters Patent should be read with this correction therein that the same may conform to the record of the case in the Patent Office.

Signed and sealed this 24th day of March, A. D. 1931.

(Seal)

M. J. Moore,
Acting Commissioner of Patents.